(12) United States Patent
Kim

(10) Patent No.: US 6,847,176 B2
(45) Date of Patent: Jan. 25, 2005

(54) APPARATUS AND METHOD FOR REMOVING HORIZONTAL MOIRE IN CATHODE-RAY TUBE MONITORS

(75) Inventor: Kyoung-hwan Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/353,598

(22) Filed: Jan. 29, 2003

(65) Prior Publication Data

US 2003/0222606 A1 Dec. 4, 2003

(30) Foreign Application Priority Data

May 30, 2002 (KR) ........................................ 2002-30292

(51) Int. Cl.[7] ................................................ G09G 1/04
(52) U.S. Cl. .................. 315/370; 315/386; 315/368.17; 315/371
(58) Field of Search ................................ 315/370, 386, 315/371, 368.17, 382.1, 368, 382, 10; 348/806, 189, 745

(56) References Cited

U.S. PATENT DOCUMENTS

| | | | |
|---|---|---|---|
| 5,747,933 A | | 5/1998 | Beeteson et al. ............... 315/1 |
| 5,872,432 A | * | 2/1999 | Beeteson .................. 315/382.1 |
| 5,959,414 A | * | 9/1999 | Yoshida et al. ............. 315/382 |
| 5,977,936 A | | 11/1999 | Kitou et al. .................. 345/12 |
| 6,147,707 A | * | 11/2000 | Terasawa et al. ........ 348/229.1 |
| 6,225,762 B1 | * | 5/2001 | Fujimori et al. ............ 315/370 |
| 6,281,889 B1 | | 8/2001 | Chen .......................... 345/204 |

FOREIGN PATENT DOCUMENTS

| | | |
|---|---|---|
| JP | 6-121195 | 4/1994 |
| JP | 7-307879 | 11/1995 |
| JP | 8-101658 | 4/1996 |
| JP | 9-27919 | 1/1997 |
| JP | 2000-4375 | 1/2000 |

* cited by examiner

Primary Examiner—Don Wong
Assistant Examiner—Chuc Tran
(74) Attorney, Agent, or Firm—F. Chau & Associates LLC; Frank V. DeRosa

(57) ABSTRACT

An apparatus and method for removing horizontal moire of a cathode-ray tube (CRT) monitor system, wherein horizontal moire can be completely removed even when the moire that occurs in an upper portion of the monitor is different from the moire that occurs in a lower portion of the monitor. In one aspect of the invention, a method for removing horizontal moire in a cathode ray tube (CRT) monitor comprises generating moire correction data in synchronization with a vertical synchronous signal, the moire correction data comprising a sawtooth waveform, adjusting one of a direct current (DC) component, an alternating current (AC) component, and both the DC and AC component, of the moire correction data, outputting the adjusted moire correction data for every other horizontal scan line in synchronization with an odd-numbered or an even-numbered horizontal synchronous signal, and delaying a horizontal drive signal in response to the output adjusted moire correction data.

18 Claims, 4 Drawing Sheets

APPARATUS AND METHOD FOR REMOVING HORIZONTAL MOIRE IN CATHODE-RAY TUBE MONITORS

CROSS-REFERENCE TO RELATED APPLICATION

This application claims priority to Korean Patent Application No. 2002-30292, filed May 30, 2002, which is incorporated herein in its entirety by reference.

TECHNICAL FIELD

The present invention relates to a monitor system, and more particularly, to an apparatus and method for removing moire in a cathode-ray tube (CRT) monitor.

BACKGROUND

Generally, CRT monitors operate by focusing and accelerating thermal electrons emitted from red (R), green (G) and blue (B) electron guns, colliding the thermal electrons to R, G and B phosphor layers through each point on a shadow mask to form a pixel, and forming a two-dimensional image by applying sawtooth waveform current to vertical and horizontal deflection coils.

CRT monitors form images by repeatedly scanning electron beams in horizontal and vertical directions. Phosphor dots provided on a screen emit light when electron beams passing through holes of a shadow mask collide therewith.

When the dots emit light, a ripple pattern or fringe pattern can appear on the monitor screen due to interference between a shadow mask and a scan pattern, which is referred to as the "moire phenomenon". The moire phenomenon occurs due to the interference between wavelengths, and moire increases as the resolution and clarity of an image increases.

Various video modes can be input into a CRT monitor and therefore, the CRT monitor is expected to appropriately display according to the various video modes. For example, horizontal synchronous signals having various frequencies in a range from 30 KHz to 90 KHz can be input to a personal computer (PC). In this situation, if a horizontal synchronous signal having a predetermined moire wavelength is input to a CRT monitor, moire having a ripple pattern appears on the CRT monitor in a vertical direction.

Some of the moire can be removed by changing the resolution or frequency of an image or the period of a horizontal synchronous signal. It is difficult to completely remove the moire, however, because the moire phenomenon will vary between different monitors (even if the monitors are the same type of CRT monitor), and the amount of moire can vary between the upper and lower portions of a single monitor.

Conventional methods for removing moire use the same control value throughout a screen to change the period of a horizontal synchronous signal and consequently, moire may partially remain on the screen, and the remaining moire cannot be completely removed.

SUMMARY OF THE INVENTION

To solve the above-described problems, it is an object of the present invention to provide an apparatus and method that can be used for completely removing moire that appears differently in different CRT monitors and for completely removing moire that appears differently in different portions of the same CRT monitor.

In one embodiment of the invention, an apparatus for removing horizontal moire in a CRT monitor comprises a moire correction data generation unit, a data output unit, and a horizontal drive signal delay circuit. The moire correction data generation unit generates moire correction data for each horizontal scan line of the CRT monitor. The data output unit selectively outputs the moire correction data in synchronization with an odd-numbered or even-numbered horizontal synchronous signal. The horizontal drive signal delay circuit delays a horizontal drive signal by a delay time corresponding to the moire correction data output from the data output unit.

Preferably, the moire correction data generation unit comprises a waveform generator for generating a sawtooth waveform in synchronization with a vertical synchronous signal of the monitor, wherein the sawtooth waveform comprises the moire correction data, and a moire correction data adjustor for adjusting an alternating current (AC) component and a direct current (DC) component of the moire correction data.

Preferably, the data output unit includes an output controller for controlling the output of the adjusted moire correction data, and a data output circuit for outputting the adjusted moire correction data every other horizontal scan line in synchronization with an odd-numbered or even-numbered horizontal synchronous signal, under the control of the output controller.

In another embodiment, an apparatus for removing horizontal moire in a CRT monitor comprises a sawtooth waveform generator, a more correction data adjustor, an output controller, a data output circuit, and a horizontal drive signal delay circuit. The sawtooth waveform generator generates a sawtooth waveform in synchronization with a vertical synchronous signal of the CRT monitor, wherein the sawtooth waveform comprises the moire correction data. The moire correction data adjustor adjusts an AC component and a DC component of the moire correction data. The output controller generates an output enable signal for controlling the output of the adjusted moire correction data. The data output circuit outputs the adjusted moire correction data every other horizontal scan line in synchronization with an odd-numbered or an even-numbered horizontal synchronous signal in response to the output enable signal. The horizontal drive signal delay circuit delays a horizontal drive signal by a delay time corresponding to the moire correction data output from the data output circuit.

In another embodiment of the invention, a method for removing horizontal moire in a CRT monitor comprises the steps of generating moire correction data in the form of a sawtooth waveform in synchronization with a vertical synchronous signal, adjusting either a DC component of the moire correction data, an AC component of the moire correction data, or both the DC and AC component of the moire correction data, outputting the adjusted moire correction data every other horizontal scan line in synchronization with an odd-numbered or an even-numbered horizontal synchronous signal, and delaying a horizontal drive signal in response to the output adjusted moire correction data.

BRIEF DESCRIPTION OF THE DRAWINGS

The above object and other objects, embodiments and advantages of the present invention will be described or become more apparent by describing in detail preferred embodiments thereof with reference to the attached drawings in which.

DETAILED DESCRIPTION OF PREFERRED EMBODIMENTS

Figure 1:
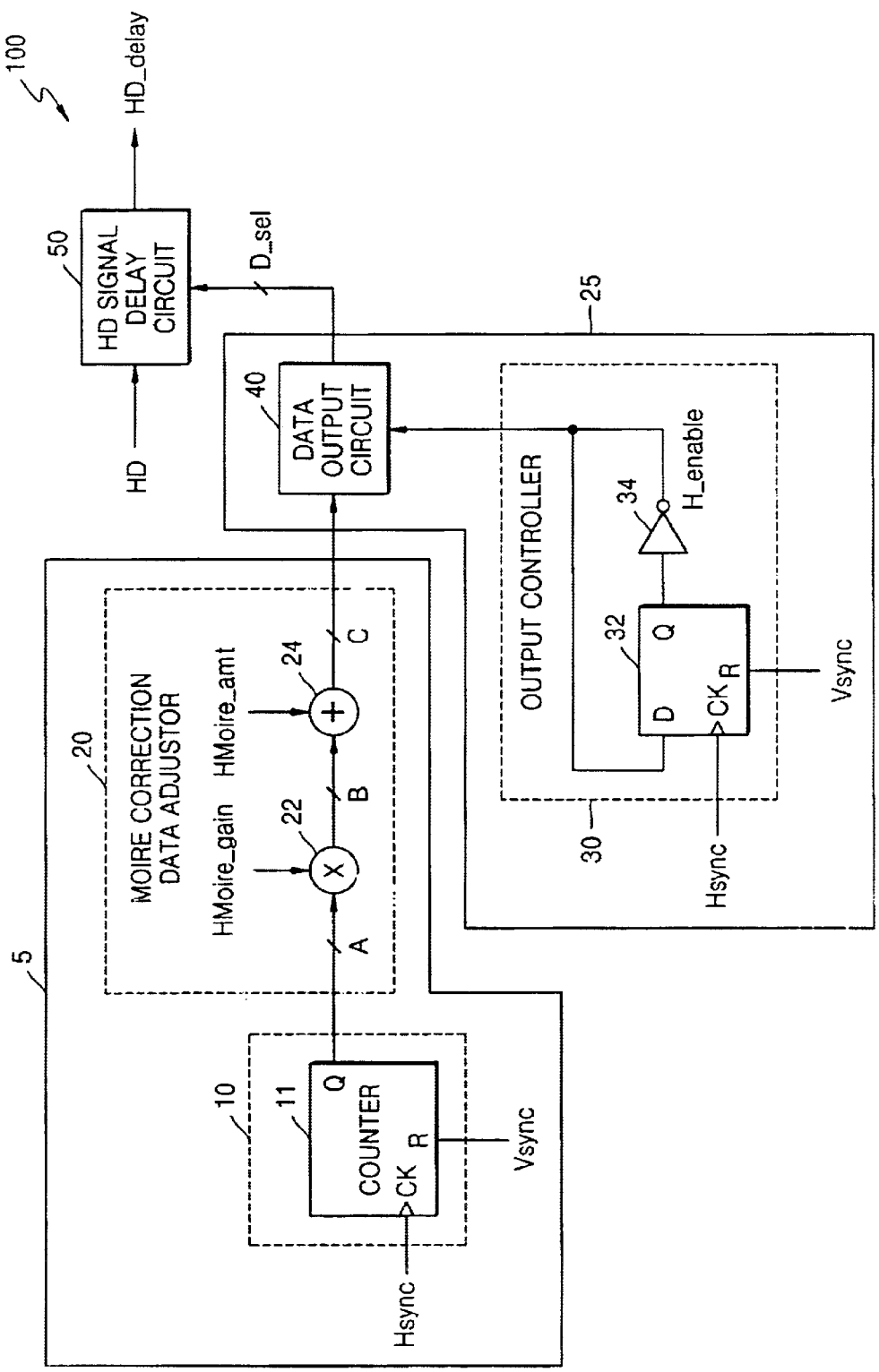
FIG. 1 is a block diagram of an apparatus for removing horizontal moire according to a preferred embodiment of the present invention.

Hereinafter, preferred embodiments of the present invention will be described in detail with reference to the attached drawings, wherein the same reference numerals denote the same or similar elements.

FIG. 1 is a block diagram of an apparatus 100 for removing horizontal moire according to a preferred embodiment of the present invention. The apparatus 100 comprises a moire correction data generation unit 5 comprising a sawtooth waveform generator 10 and a moire correction data adjustor 20, a data output unit 25 comprising an output controller 30 and a data output circuit 40, and a horizontal drive (HD) signal delay circuit 50. In general, the moire correction data generation unit 5 generates moire correction data for each horizontal scan line of a CRT monitor, the data output unit 25 selectively outputs the moire connection data in synchronization with an odd-numbered or even-numbered horizontal synchronous signal, and the horizontal drive signal delay circuit 50 delays a horizontal drive signal by a delay time corresponding to the moire correction data output from the data output unit 25.

The sawtooth waveform generator 10 preferably comprises a counter 11 that receives a vertical synchronous signal (Vsync) as a reset signal R and a horizontal synchronous signal (Hsync) as a clock signal CK. The sawtooth waveform generator 10 counts the number of periods of a horizontal synchronous signal (Hsync) per period of the vertical synchronous signal (Vsync) so as to generate a sawtooth waveform. The sawtooth waveform is used as the moire correction data for correcting moire. The counter 11 is just one exemplary embodiment of the sawtooth waveform generator 10, although it is to be understood that various circuits and devices can be used to generate such waveform.

The moire correction data adjuster 20 includes a multiplier 22, which multiplies the output of the sawtooth waveform generator 10 by a predetermined moire gain (HMoire_gain), and an adder 24, which adds a user-selected amount of moire (HMoire_amt) as an offset value to the output of the multiplier 22.

The moire gain (HMoire_gain) and the amount of (moire HMoire_amt) can be adjusted by a user. The moire gain (HMoire_gain) is used to adjust an alternating current (AC) component of the moire correction data, and the amount of moire (HMoire_amt) is used to adjust a direct current (DC) component of the moire correction data.

The output controller 30 preferably comprises a D flip-flop 32, which receives the vertical synchronous signal (Vsync) as a reset signal (R) and the horizontal synchronous signal (Hsync) as a clock signal (CK). The output controller 30 further comprises an inverter 34, which inverts the output Q of the D flip-flop 32.

The output signal (H_enable) of the inverter 34 is transmitted to a data input terminal (D) of the D flip-flop 32 and the data output circuit 40. The D flip-flop 32 outputs a logic value of 1 per odd-numbered or even-numbered period of the horizontal synchronous signal (Hsync) in response to the horizontal synchronous signal (Hsync) input through a clock terminal (CK) and the output signal (H_enable) of the inverter 34, which is input through the data input terminal (D).

In other words, the output controller 30 generates a horizontal output enable signal (H_enable), which alternately has logic values of 0 and 1, in synchronization with the horizontal synchronous signal (Hsync). The data output circuit 40 outputs moire correction data every other horizontal synchronous signal (Hsync) in response to the horizontal output enable signal (H_enable).

The data output circuit 40 selectively outputs the moire correction data C received from the moire correction data adjustor 20 in response to the horizontal output enable signal (H_enable) received from the output controller 30. For example, when the horizontal output enable signal (H_enable) received from the output controller 30 has a logic value of 0, the data output circuit 40 transmits a logic value of 0, instead of the moire correction data C received from the moire correction data adjustor 20, to the HD signal delay circuit 50. When the horizontal output enable signal (H_enable) received from the output controller 30 has a logic value of 1, the data output circuit 40 transmits the moire correction data C received from the moire correction data adjustor 20 to the HD signal delay circuit 50.

The HD signal delay circuit 50 receives an HD signal, which is generated from an HD signal generator circuit (not shown), and delays the HD signal by a predetermined period of time in response to the moire correction data (D_sel) output from the data output circuit 40 before outputting the HD signal. The delay time for the HD signal depends on the moire correction data (D_sel) output from the data output circuit 40, that is, the amount of moire in a relevant horizontal scan line.

Figure 2:
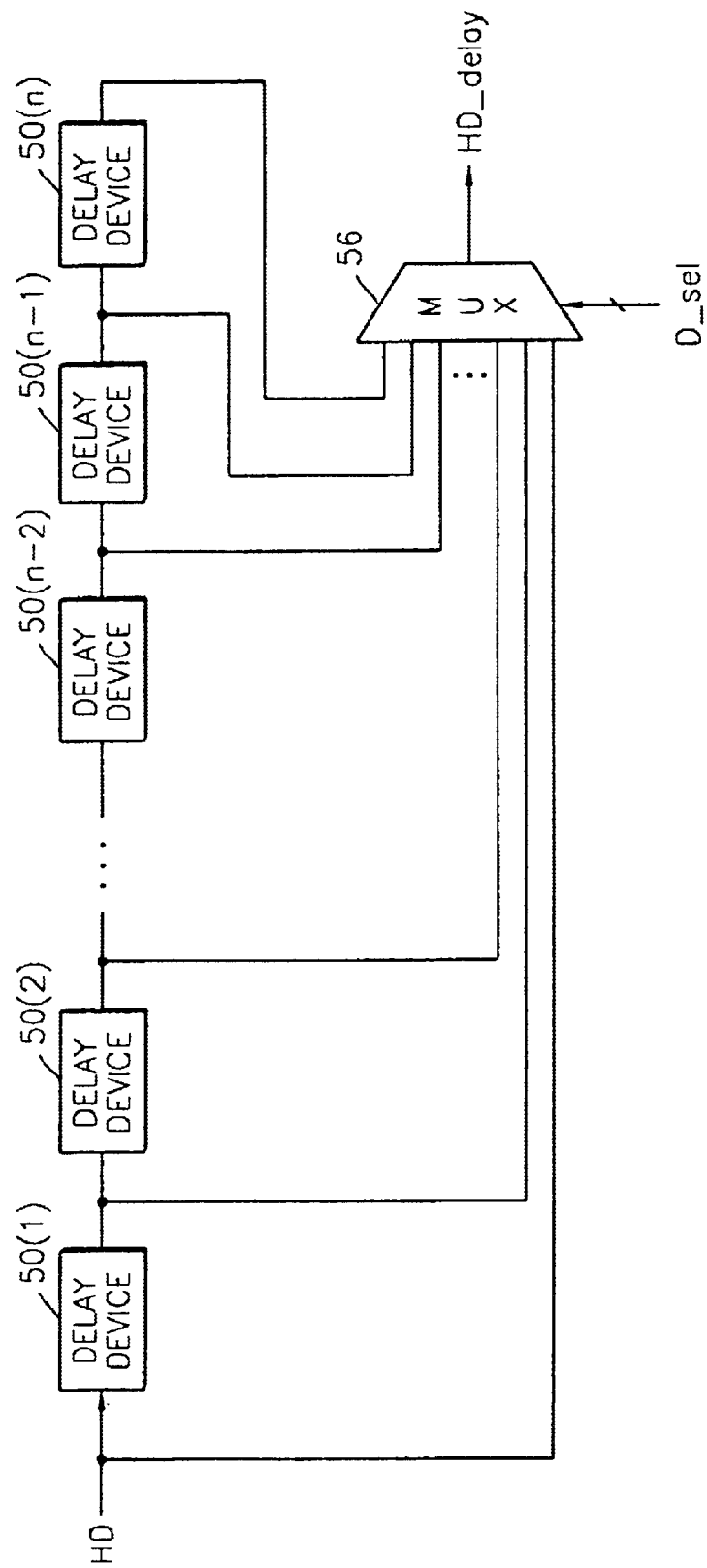
FIG. 2 is a detailed block diagram of the horizontal drive (HD) signal delay circuit according to an embodiment of the present invention, which is preferably implemented in the apparatus of FIG. 1.

The moire correction data (D_sel) transmitted from the data output circuit 40 to the HD signal delay circuit 50 is used as a selection signal (D_sel) of a multiplexer (MUX) 56 shown in FIG. 2 of the HD signal delay circuit 50. The magnitude of the moire correction data (D_sel) is determined in accordance with the amount of moire occurring in a relevant horizontal scan line. For example, when a large amount of moire occurs in a horizontal scan line, the moire correction data (D_sel) has a large value. When a small amount of moire occurs in a horizontal scan line, the moire correction data (D_sel) has a small value. The magnitude of the moire correction data (C or D_sel) is adjusted according to the moire gain (HMoire_gain) and the amount of moire (HMoire_amt), which are input by a user.

The HD signal generator circuit, which provides the HD signal to the HD signal delay circuit 50, may comprise any suitable analog or digital circuit.

FIG. 2 is a detailed block diagram of the HD signal delay circuit 50 shown in FIG. 1. Referring to FIG. 2, the HD signal delay circuit 50 includes a plurality of delay devices 50(1) through 50(n) (where "n" is an integer equal to or greater than 1) and a MUX 56.

The delay devices 50(1) through 50(n) have the same delay time. The first delay device 50(1) receives the HD signal, delays the HD signal by a predetermined period of time, and then outputs the delayed HD signal to the second delay device 50(2). The second delay device 50(2) delays the output signal of the first delay device 50(1) by a predetermined period of time and transmits the delayed signal to the next delay device. As described above, each of the delay devices 50(1) through 50(n) delays an input signal by a predetermined period of time (which is preferably the same for each delay device) and outputs the result of delay to the next delay device.

The MUX 56 receives the HD signal and the output signal of each delay device 50(1) through 50(n), selects one of the received signals in response to the selection signal (D_sel) output from the data output circuit 40, and then outputs the selected signal as the delayed HD signal (HD_delay). The HD signal has the same period as the horizontal synchronous signal (Hsync) and delays the driving of a horizontal scan line by a predetermined delay time, thereby removing moire.

The process of removing moire is performed differently per odd-numbered or even-numbered scan lines (i.e., every other scan line) in each field. Accordingly, the moire that appears differently in different portions of a cathode-ray tube (CRT) monitor can be completely removed.

A moire removing function can be performed through an on-screen display (OSD) menu. The content adjusted by the user via the OSD menu is stored in a monitor so that the user does not need to reset monitor control information. Accordingly, once moire is removed through OSD, the CRT monitor maintains the resulting state.

Figure 3:
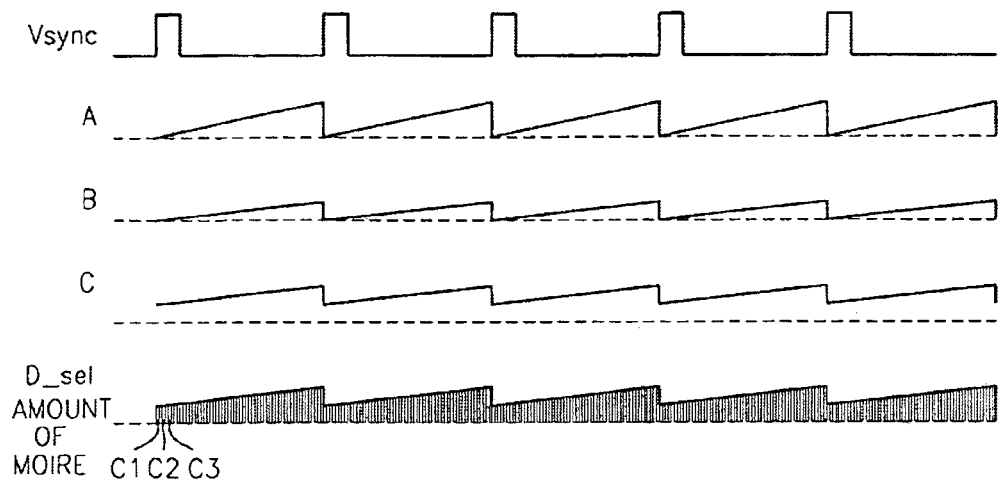
FIG. 3 is an exemplary waveform diagram showing the input/output signals of the multiplier and adder, which are included in the moire correction data adjustor shown in FIG. 1, and the output signal of the data output circuit shown in FIG. 1.

FIG. 3 is an exemplary waveform diagram showing the input/output signals A, B, and C of the multiplier 22 and adder 24, which are included in the moire correction data adjustor 20 shown in FIG. 1, and the output signal (D_sel) of the data output circuit 40 shown in FIG. 1. An example of a mode of operation of the apparatus 100 for removing horizontal moire according to the embodiment of the present invention will be described with reference to FIG. 3.

Referring to FIG. 3, the apparatus 100 counts the number of periods of a horizontal synchronous signal (Hsync) per period of vertical synchronous signal (Vsync) and generates the sawtooth waveform A having a predetermined slope as moire correction data. The slope of the sawtooth waveform A varies with the moire gain (HMoire_gain).

The sawtooth waveform B shown in FIG. 3 is the result of multiplying the sawtooth waveform A by a moire gain (HMoire_gain) smaller than 1. The sawtooth waveform C is the result of adding the sawtooth waveform B and the amount of moire (HMoire_amt).

The sawtooth waveform C is output as moire correction data per odd- or even-numbered period of the horizontal synchronous signal (Hsync) by operation of the output controller 30 and the data output circuit 40. As a result, a signal (D_sel) having a waveform shown in FIG. 3 is obtained. The signal (D_sel) corresponds to the amount of moire to be corrected for each horizontal line.

Figure 4:
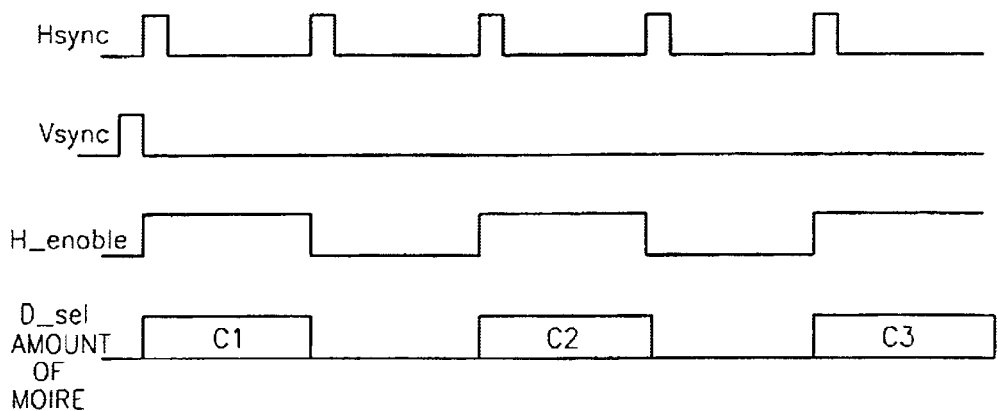
FIG. 4 is an enlarged waveform diagram of a portion of the output signal of the data output circuit as shown in FIG. 3.

FIG. 4 is an enlarged waveform diagram of a portion of the output signal (D_sel) of the data output circuit 40 shown in FIG. 3. Referring to FIG. 4, during a single period of the vertical synchronous signal (Vsync), the output controller 30 outputs the horizontal output enable signal (H_enable) alternately having logic values of 0 and 1 in response to the horizontal synchronous signal (Hsync).

Whenever the horizontal output enable signal (H_enable) has a logic value of 1, the data output circuit 40 outputs the sawtooth waveform C as the signal (D_sel). Here, the data output circuit 40 outputs signals C1, C2, and C3 as the output signal (D_sel).

Referring to FIG. 4, the signal C2 is wider than the signal C1, and the signal C3 is wider than the signal C2. This signal structure is shown when the width of moire increases as a scan line gets lowered. As the width of moire, that is, the amount of moire, increases, the HD signal is increasingly delayed. In other words, a delay of the HD signal varies with the amount of moire, i.e., C1, C2, or C3, which exits in each horizontal scan line.

As described above, the apparatus 100 for removing horizontal moire according to an embodiment of the present invention changes the delay of the HD signal according to the amount of moire existing in each horizontal scan line. Accordingly, moire which appears differently (depending on the portion of the CRT monitor) can be completely removed.

Figure 5:
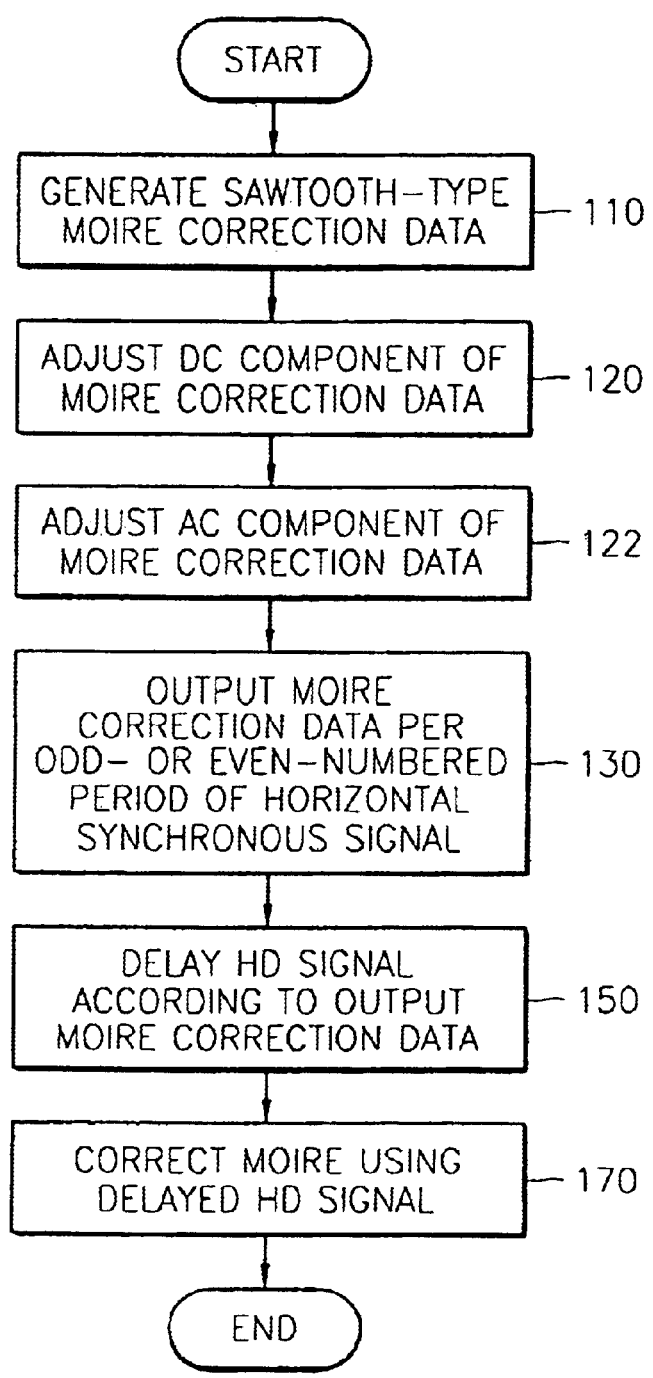
FIG. 5 is a flowchart of a method for removing horizontal moire according to a preferred embodiment of the present invention.

FIG. 5 is a flowchart of a method for removing horizontal moire according to a preferred embodiment of the present invention. Referring to FIG. 5, the number of periods of a horizontal synchronous signal (Hsync) that occur in a period of the vertical synchronous signal (Vsync) is counted to generate sawtooth-type moire correction data (step 110).

Next, the DC component of the moire correction data is adjusted (step 120). The DC component of the moire correction data is adjusted by adding a predetermined amount of moire (HMoire_amt) to the moire correction data. For this operation, the multiplier 22 of the moire correction data adjuster 20 uses the moire gain (HMoire_gain) having a logic value of 0, and the adder of the moire correction data adjuster 20 uses the amount of moire (HMoire_amt) input by a user. As a result, the values of the moire correction data with respect to an entire screen either increase or decrease uniformly, and moire decreases as a whole.

After the DC component of the moire correction data is adjusted, the AC component of the moire correction data is adjusted (step 122). For this operation, the multiplier 22 of the moire correction data adjuster 20 uses the moire gain (HMoire_gain) having a positive or negative integer value other than 0. As a result, the value of the moire correction data is finely adjusted for each horizontal scan line.

The moire correction data that has been adjusted (in steps 120 and 122) is output every other period of the horizontal synchronous signal Hsync by the data output circuit 40 under the control of the output controller 30 (step 130). A signal (D_sel) output from the data output circuit 40 corresponds to the amount of moire to be corrected for each horizontal scan line.

Next, the output signal (D_sel) of the data output circuit 40 is input into the HD signal delay circuit 50 and delays the HD signal by a predetermined period of time (step 150). Next, moire is corrected according to the delayed HD signal (HD_delay) (step 170).

Advantageously, as described above, an apparatus and method according to the present invention for removing horizontal moire allow moire to be completely removed, even when moire appears differently in different portions of a CRT monitor, by adjusting the period of the HD signal per odd-numbered or even-numbered scan lines of each field.

In the drawings and specification, preferred embodiments of the invention have been described using specific terms but it is to be understood that such terms have been used only in a descriptive sense and such descriptive terms should not be construed as placing any limitation on the scope of the invention. Accordingly, it will be apparent to those of ordinary skill in the art that various changes can be made to the embodiments without departing from the scope and spirit of the invention. Therefore, the scope of the invention is defined by the appended claims.

What is claimed is:

1. An apparatus for removing horizontal moire in a cathode-ray tube (CRT) monitor, the apparatus comprising:
   a moire correction data generation unit for generating moire correction data for each horizontal scan line of the ORT monitor, wherein the moire correction data generation unit comprises a waveform generator for generating a sawtooth waveform in synchronization with a vertical synchronous signal of the monitor, wherein the sawtooth waveform comprises the moire correction data, and a moire correction data adjustor for adjusting one of an alternating current (AC) component, a direct current (DC) component, and both the AC and DC comoonents, of the moire correction data;
   a data output unit for selectively outputting the moire correction data in synchronization with an odd-numbered or even-numbered horizontal synchronous signal; and
   a horizontal drive signal delay circuit for delaying a horizontal drive signal by a delay time corresponding to the moire correction data output from the data output unit.

2. The apparatus of claim 1, wherein the data output unit comprises:
   an output controller for controlling the output of the adjusted moire correction data; and
   a data output circuit, which operates under the control of the output controller, for outputting the adjusted moire correction data for every other horizontal scan line in synchronization with an odd-numbered or an even-numbered horizontal synchronous signal.

3. An apparatus for removing horizontal moire in a cathode-ray tube (CRT) monitor, the apparatus comprising:
   a waveform generator for generating a sawtooth waveform in synchronization with a vertical synchronous signal of the monitor, wherein the sawtooth waveform comprises moire correction data;
   a moire correction data adjustor for adjusting an alternating current (AC) component and a direct current (DC) component of the moire correction data;
   an output controller for generating an output enable signal;
   a data output circuit for outputting the adjusted moire correction data for every other horizontal scan line in synchronization with an odd-numbered or an even-numbered horizontal synchronous signal, in response to the output enable signal; and
   a horizontal drive signal delay circuit for delaying a horizontal drive signal by a delay time corresponding to the moire correction data output from the data output circuit.

4. The apparatus of claim 3, wherein the waveform generator comprises a counter for counting a number of periods of the horizontal synchronous signal that occur during a single period of the vertical synchronous signal.

5. The apparatus of claim 3, wherein the moire correction data adjustor comprises:
   a multiplier for multiplying the moire correction data by a predetermined moire gain to adjust the AC component of the moire correction data; and
   an adder for adding a predetermined amount of moire to the moire correction data to adjust the DC component of the moire correction data.

6. The apparatus of claim 5, wherein the moire gain and the amount of moire are externally input by a user.

7. The apparatus of claim 3, wherein the adjusted moire correction data corresponds to the amount of moire existing in a horizontal scan line.

8. The apparatus of claim 3, wherein the delay time is proportional to a magnitude of the adjusted moire correction data.

9. The apparatus of claim 3, wherein the output controller comprises:
   a D flip-flop which receives the vertical synchronous signal as a reset signal and receives the horizontal synchronous signal as a clock signal; and
   an inverter which inverts an output of the D flip-flop and outputs the inverted signal to a data input terminal of the D flip-flop and to the data output circuit.

10. The apparatus of claim 9, wherein the D flip-flop toggles the output of the inverter in response to the horizontal synchronous signal so as to output the output enable signal alternately having logic values of 0 and 1.

11. The apparatus of claim 10, wherein the data output circuit outputs the adjusted moire correction data to the horizontal drive signal delay circuit when the output enable signal has a logic value of 1.

12. The apparatus of claim 3, wherein the horizontal drive signal delay circuit comprises:
   a plurality of serially connected delay devices, wherein each delay device delays the horizontal drive signal by a corresponding delay time; and
   a multiplexer which selects for output, the horizontal drive signal or a delayed horizontal drive signal output from one of the delay devices, in response to the adjusted moire correction data.

13. The apparatus of claim 12, wherein each delay device provides the same delay time.

14. A method for removing horizontal moire in a cathode ray tube (CRT) monitor, the method comprising the steps of:
   generating moire correction data in synchronization with a vertical synchronous signal, the moire correction data comprising a sawtooth waveform that is generated by counting a number of periods of a horizontal synchronous signal that occur during a single period of the vertical synchronous signal;
   adjusting one of a direct current (DC) component, an alternating current (AC) component, and both the DC and AC component, of the moire correction data;
   outputting the adjusted moire correction data for every other horizontal scan line in synchronization with an odd-numbered or an even-numbered horizontal synchronous signal; and
   delaying a horizontal drive signal in response to the output adjusted moire correction data.

15. The method of claim 14, wherein the adjusted moire correction data corresponds to the amount of moire existing in a horizontal scan line.

16. The method of claim 14, wherein the step of delaying comprises delaying the horizontal drive signal by a delay time corresponding to the moire correction data.

17. The apparatus of claim 1, wherein the horizontal drive signal delay circuit comprises:
   a plurality of serially connected delay devices, wherein each delay device delay the horizontal drive signal by a corresponding delay time; and
   a multiplexer which selects for output, the horizontal drive signal or a delay horizontal drive signal output from one of the delay devices, in response to the adjusted moire correction data.

18. The apparatus of claim 17, wherein each delay device provides the same delay time.

* * * * *